(12) United States Patent
Barrass (10) Patent No.: US 11,043,878 B2
(45) Date of Patent: Jun. 22, 2021

(54) STATOR ASSEMBLY FOR COOLING AN ELECTRIC MOTOR

(71) Applicant: Sevcon Limited, Gateshead (GB)

(72) Inventor: Peter Barrass, Gateshead (GB)

(73) Assignee: Sevcon Limited, Gateshead (GB)

( * ) Notice: Subject to any disclaimer, the term of this patent is extended or adjusted under 35 U.S.C. 154(b) by 208 days.

(21) Appl. No.: 16/318,507

(22) PCT Filed: Jul. 19, 2017

(86) PCT No.: PCT/GB2017/052132
§ 371 (c)(1),
(2) Date: Jan. 17, 2019

(87) PCT Pub. No.: WO2018/015755
PCT Pub. Date: Jan. 25, 2018

(65) Prior Publication Data
US 2019/0245414 A1 Aug. 8, 2019

(30) Foreign Application Priority Data

Jul. 19, 2016 (GB) ...................................... 1612521
Mar. 30, 2017 (GB) ...................................... 1705165

(51) Int. Cl.
| | |
|---|---|
| *H02K 11/00* | (2016.01) |
| *H02K 3/28* | (2006.01) |
| *H02K 9/10* | (2006.01) |
| *H02K 9/19* | (2006.01) |
| *H02K 11/33* | (2016.01) |

(Continued)

(52) U.S. Cl.
CPC ........... *H02K 11/0094* (2013.01); *H02K 3/28* (2013.01); *H02K 9/10* (2013.01); *H02K 9/19* (2013.01); *H02K 11/04* (2013.01); *H02K 11/33* (2016.01); *H02K 9/14* (2013.01); *H02K 2213/12* (2013.01)

(58) Field of Classification Search
CPC .. H02K 1/20; H02K 1/32; H02K 3/24; H02K 5/12; H02K 5/20; H02K 9/00; H02K 9/005; H02K 9/18; H02K 11/0094; H02K 11/04; H02K 3/28; H02K 9/10; H02K 9/19; H02K 11/33; H02K 9/14; H02K 2213/12
USPC ...................................................... 310/54, 71
See application file for complete search history.

(56) References Cited

U.S. PATENT DOCUMENTS

| | | | |
|---|---|---|---|
| 3,239,701 A | 3/1966 | Campbell | |
| 4,329,603 A * | 5/1982 | Ballard | ................ H02K 11/042 310/54 |
| 4,915,068 A | 4/1990 | Tharman | |

(Continued)

FOREIGN PATENT DOCUMENTS

| | | |
|---|---|---|
| DE | 101 63 587 A1 | 7/2003 |
| DE | 10 2013 224504 A1 | 6/2015 |

(Continued)

OTHER PUBLICATIONS

PCT/GB2017/052132 Search report dated Dec. 6, 2017.

*Primary Examiner* — Ahmed Elnakib
(74) *Attorney, Agent, or Firm* — Woodard Emhardt Henry Reeves & Wagner LLP (57) ABSTRACT

A stator assembly comprising stator windings and power electronics coupled to the windings for powering the windings, wherein the stator assembly is arranged so that when it is disposed in an enclosure, a flow of coolant is channelled over both the windings and elements of the power electronics.

16 Claims, 6 Drawing Sheets

(51) Int. Cl.
*H02K 11/04* (2016.01)
*H02K 9/14* (2006.01)

(56) References Cited

U.S. PATENT DOCUMENTS

| | | | |
|---|---|---|---|
| 2002/0130565 | A1 | 9/2002 | Tilton |
| 2006/0174642 | A1* | 8/2006 | Nagashima ............. F28D 15/00 |
| | | | 62/259.2 |
| 2007/0188029 | A1* | 8/2007 | Kurita ................... F04D 29/588 |
| | | | 310/67 R |
| 2012/0112568 | A1* | 5/2012 | Chamberlin ............ B60L 50/51 |
| | | | 310/54 |
| 2012/0112573 | A1* | 5/2012 | Chamberlin ........... H02K 11/33 |
| | | | 310/59 |
| 2016/0276895 | A1* | 9/2016 | Aizawa ................... H02K 5/18 |

FOREIGN PATENT DOCUMENTS

| | | |
|---|---|---|
| EP | 0 642 703 A1 | 3/1995 |
| EP | 0642703 * | 3/1995 |
| EP | 2 711 296 A2 | 3/2014 |
| JP | H09182380 A | 7/1997 |

* cited by examiner

STATOR ASSEMBLY FOR COOLING AN ELECTRIC MOTOR

FIELD OF THE INVENTION

The present disclosure relates to an electric motor stator assembly and a method for preparing an electric motor.

BACKGROUND

Electric motors are typically controlled using a motor controller outside the motor. The controller typically comprises power electronics operable to drive the electric motor, for example by controlling currents in windings in a stator assembly of the motor. The windings and associated power electronics, as well as other current-carrying components such as DC-DC, DC-AC, AC-DC, or AC-AC connections, may get hot in normal use.

Dissipation of heat from electric motors and their controllers is a problem. If the motor overheats, the efficiency of the motor may decrease, and ultimately damage may occur to the motor and/or controller. One way to deal with this heat is to couple the power electronics of the controller to a heat sink having a large surface area.

Putting lots of heat generating components in a small space is undesirable as this will inhibit the dissipation of heat. The motor controller comprising the power electronics is therefore located outside the motor to aid the dissipation of heat generated from the windings and the power electronics. It also means the controller can be located as close as possible to the large heat sink.

Another way to deal with the problem of heat dissipation (which is often used in combination with the use of a heat sink) is to space the power electronics out (i.e. decrease their density) so that the heat density is decreased and so that the power electronics can be cooled more effectively. This means that the controller will be relatively large due to the spacing of the power electronics. It is, however, desirable to make electric motors as small as possible. Because the controller is relatively large, providing the controller separately to the electric motor helps to reduce the size of the electric motor.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In an aspect the disclosure provides a stator assembly comprising stator windings and power electronics coupled to the windings for powering the windings; wherein the stator assembly is arranged so that when it is disposed in an enclosure, a flow of coolant is channelled over both the windings and elements of the power electronics.

The stator assembly may be an electronic motor stator assembly. In this case, the stator windings are for driving a rotor of the motor. Such a stator assembly comprises an enclosure; wherein elements of the power electronics and windings are housed in the enclosure and the enclosure is arranged to channel the flow of coolant over both the windings and the elements of the power electronics.

The stator assembly may be a stator assembly for a linear electrical machine. In which case, the stator windings are for driving an actuator of the machine, and the stator assembly comprises an enclosure; wherein elements of the power electronics and windings are housed in the enclosure which is arranged to channel the flow of coolant over both the windings and the elements of the power electronics.

The linear electrical machine may comprise a linear induction motor.

For example, there is described herein an electric motor stator assembly comprising: a plurality of stator windings for driving a rotor of the motor; power electronics coupled to the windings for powering the windings, and an enclosure; wherein elements of the power electronics and windings are housed in the enclosure which is arranged to channel a flow of coolant over both the windings and the elements of the power electronics.

The enclosure may be arranged so that the flow of coolant inside the enclosure is in direct contact with both the elements of the power electronics and the windings.

The enclosure may be arranged so that the flow of coolant passes between at least some of the elements of the power electronics.

The enclosure may be arranged so that the elements of the power electronics are bathed in, for example at least partially immersed in, the flow of coolant in the enclosure.

The stator assembly may be arranged so that the elements of the power electronics have equal thermal contact with the coolant on at least three sides in the enclosure.

At least some of the elements of the power electronics may be supported suspended in the enclosure, so that coolant can flow both over and under the elements of the power electronics.

The elements of the power electronics may at least partially define boundary of a flow path in the stator assembly.

The enclosure may be radially outside the rotor and may at least partially encircle the rotor.

For example, the electric motor may have a rotation axis. The enclosure may be radially outside the rotor in a direction transverse to the rotation axis, and/or the enclosure may extend axially beyond the rotor.

The enclosure may comprise two cavities coupled by a channel, wherein the first cavity is at least partially in the stator assembly and the second cavity is located axially of the first cavity.

The windings may be in the first cavity and the power electronics may be in the second cavity.

The elements of the power electronics may be interleaved with the windings in the enclosure. For example, in this way, the elements of the power electronics may be embedded in the stator assembly. In such examples, the electric motor has a rotation axis, and the windings may extend in towards the rotation axis from a first depth to a second depth; wherein the elements of the power electronics are located between the first depth and the second depth. For example, the enclosure may be arranged to allow the flow of coolant over both the windings and the elements of the power electronics between the first depth and the second depth.

The stator assembly may comprise an active length, the active length being shorter than the length over which the windings extend in the rotation axis. The elements of the power electronics may be disposed outside the active length.

The elements of the power electronics may comprise the heat generating elements of the power electronics, such as the power ICS.

The power electronics may be operable to provide at least one of an AC to AC converter, a DC to AC inverter, a DC to DC converter and an AC to DC inverter. For example, in the electric motor may comprise a DC supply to the power electronics and an AC supply from the power electronics to the windings, wherein the elements of the power electronics comprises at least one of the DC supply to the power electronics and the AC supply to the windings, for example at least part of the AC bus and/or at least part of the AC bus.

The electric motor may have a rotation axis, and the windings may extend from a first radial distance to a second radial distance from the rotation axis; and the elements of the power electronics may be located within (e.g. between) the first and second radial distances.

The enclosure may be configured to allow the flow of coolant over both the windings and the elements of the power electronics between the first and second radial distances.

The rotor and stator assembly may be provided in a housing, the enclosure being inside the housing.

The apparatus may comprise a coolant inlet and a coolant outlet configured to allow the flow of a coolant from outside the housing to the enclosure via the coolant inlet, over both the windings and the power electronics coupled to the windings inside the enclosure, and back outside the housing from the enclosure via the coolant outlet.

The elements of the power electronics may comprise at least one of: an inductor, a capacitor, a DC link capacitor, a DC bus bar, an AC bus bar, a voltage controlled impedance, a power connection and a radiator embedded in the stator assembly protruding into the enclosure.

The coolant may have a higher heat capacity than air, for example the coolant may be a dielectric liquid.

The stator assembly may comprise a respective set of power electronics for driving each winding, for example wherein the sets are interleaved between the stator windings, for example wherein each set comprises at least one inverter leg. For example, the apparatus may comprise a plurality of enclosures wherein each set of power electronics is housed in a respective one of the plurality of enclosures with at least one stator winding, for example the stator winding driven by the each set of power electronics.

The electric motor may comprise a respective set of power electronics per phase of the windings.

The stator assembly may be arranged to direct the flow of coolant over the windings and elements of the power electronics in a circumferential direction.

At least one of: (a) the plurality of windings; and (b) the power electronics; may be at least partially distributed around the circumference of the stator assembly.

The apparatus may comprise a plurality of sets of power electronics, the plurality of sets of power electronics, the plurality of sets of power electronics at least partially distributed around the circumference of the stator assembly.

Also described herein is an electric motor stator assembly, the stator assembly comprising a plurality of stator windings for driving a rotor of the motor; wherein
  the stator assembly comprises power electronics coupled to the windings and for powering the windings, and an enclosure;
  wherein the power electronics are coupled to a heatsink in the enclosure; and
  wherein the stator assembly is arranged so that coolant in the motor can be in direct contact with both the heatsink and the windings.

The rotor and stator assembly may be provided in a common housing comprising a coolant inlet and a coolant outlet configured to allow the flow of a coolant from outside the common housing via the coolant inlet, over both the windings and the heat sink coupled to elements of the power electronics, and back outside the common housing via the coolant outlet.

Such a stator assembly may comprise the features of any of the above described apparatus.

Also described herein is an electric motor stator assembly comprising:
  a plurality of stator windings for driving a rotor of the motor;
  power electronics embedded in the stator assembly; and
  a coolant flow path arranged to allow the flow of coolant directly over both the windings and the power electronics.

Such an apparatus may comprise the features of any of the above described apparatus.

Also described herein is an electric motor comprising a plurality of stator windings and power electronics coupled to the stator windings operable to drive the electric motor;
  the electric motor arranged so that elements of the power electronics and the windings share an enclosure allowing the flow of a common coolant directly over both the windings and the elements of the power electronics.

Such an apparatus may comprise a stator assembly having the features of any of the stator assemblies described or claimed herein.

Also described herein is a method of assembling an electric motor, or preparing an electric motor for use, the method comprising:
  providing a stator assembly comprising stator windings, power electronics, and a coolant flow path for cooling the stator windings and the power electronics, wherein the stator windings, the power electronics, and the coolant flow path are integrated into the stator assembly;
  and providing a dielectric liquid into the coolant flow path to expel air from spaces between the stator windings and elements of the power electronics, thereby to directly bathe both in the dielectric liquid.

The method may further comprise assembling a rotor to the stator assembly.

The method may comprise enclosing at least the stator windings and the power electronics in a liquid tight enclosure.

The method may further comprise fixing the stator assembly into a motor housing.

The electric motor stator assembly may comprise the features of any of those described herein.

Also described herein is a stator assembly for a linear electrical machine, the stator assembly comprising:
  a plurality of stator windings for driving an actuator of the machine;
  power electronics coupled to the windings for powering the windings, and an enclosure;
  wherein elements of the power electronics and windings are housed in the enclosure which is arranged to channel a flow of coolant over both the windings and the elements of the power electronics.

This stator assembly may have the features of any of the stator assemblies described herein.

DRAWINGS

Embodiments of the disclosure will now be described, by way of example only, with reference to the accompanying drawings, in which.

SPECIFIC DESCRIPTION

Figure 1:
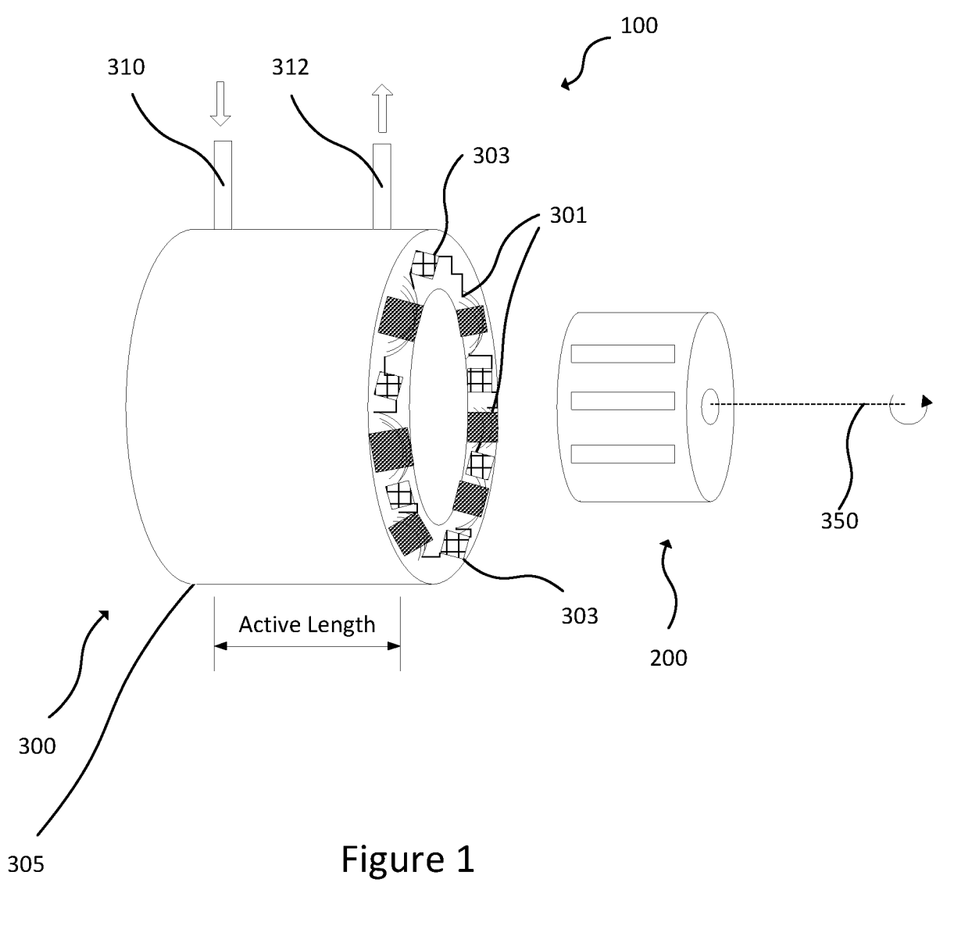
FIG. 1 shows a perspective exploded view of an example electric motor of embodiments of the disclosure comprising a stator assembly and a rotor.

Embodiments of the disclosure relate to an electric motor stator assembly, for example as shown in FIG. 1. For example, embodiments of the disclosure relate to a stator assembly of an electric motor with an integrated inverter and direct cooling of the inverter and stator windings.

The electric motor stator assembly is arranged to cool stator windings and elements of the power electronics using a common coolant. The electric motor has a stator assembly that comprises a plurality of stator windings for driving the motor and power electronics coupled to the windings for powering the windings. The power electronics and stator windings are in an enclosure that is arranged to channel the flow of a coolant directly over both the windings and elements of the power electronics.

Embodiments of the disclosure therefore allow the direct cooling of both elements of the power electronics and the stator windings, which may allow these components to be more effectively cooled. For example, the elements of the power electronics may be cooled on all sides. More effective cooling, in turn, may allow components to be miniaturised, thus decreasing the overall footprint of the electric motor and its associated electronics.

One aspect of the disclosure relates to an electric motor stator assembly comprising a plurality of stator windings for driving a rotor of the motor. The stator assembly comprises power electronics coupled to the windings for powering the windings, and an enclosure. The power electronics and the windings are housed in the enclosure which is arranged to channel the flow of a coolant over both the windings and the elements of the power electronics.

Another aspect of the disclosure relates to an electric motor stator assembly comprising a plurality of stator windings for driving a rotor of the motor, wherein the power electronics are embedded in the stator assembly, and the stator assembly comprises a coolant flow path arranged to allow the flow of coolant directly over both the windings and the power electronics.

Another aspect of the disclosure relates to an electric motor comprising a plurality of stator windings and power electronics coupled to the stator windings operable to drive the electric motor. The electric motor is arranged so that elements of the power electronics and the windings share an enclosure allowing the flow of a coolant directly over both the windings and the elements of the power electronics.

Figure 2:
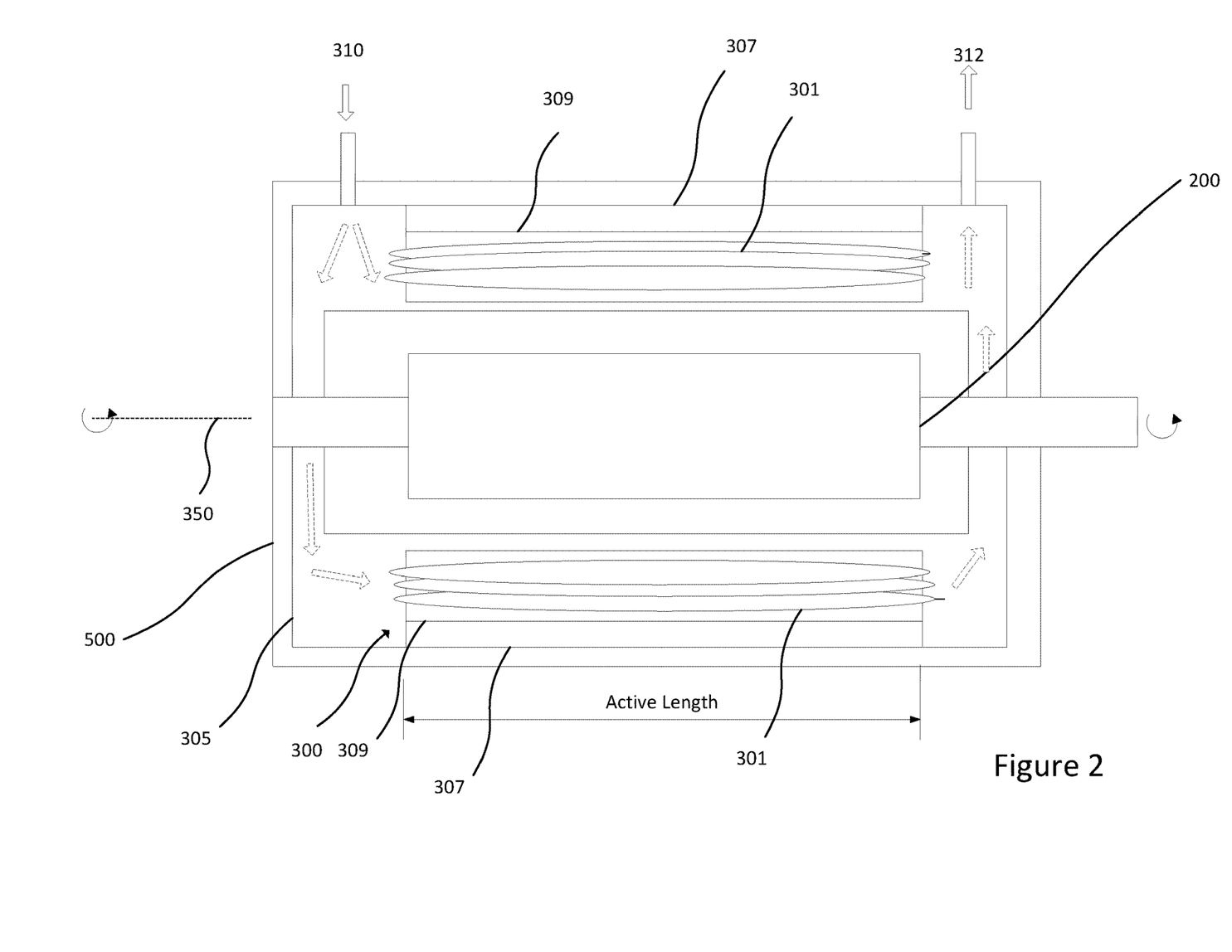
FIG. 2 shows a side cross-section through the example electric motor of FIG. 1.
Figure 3:
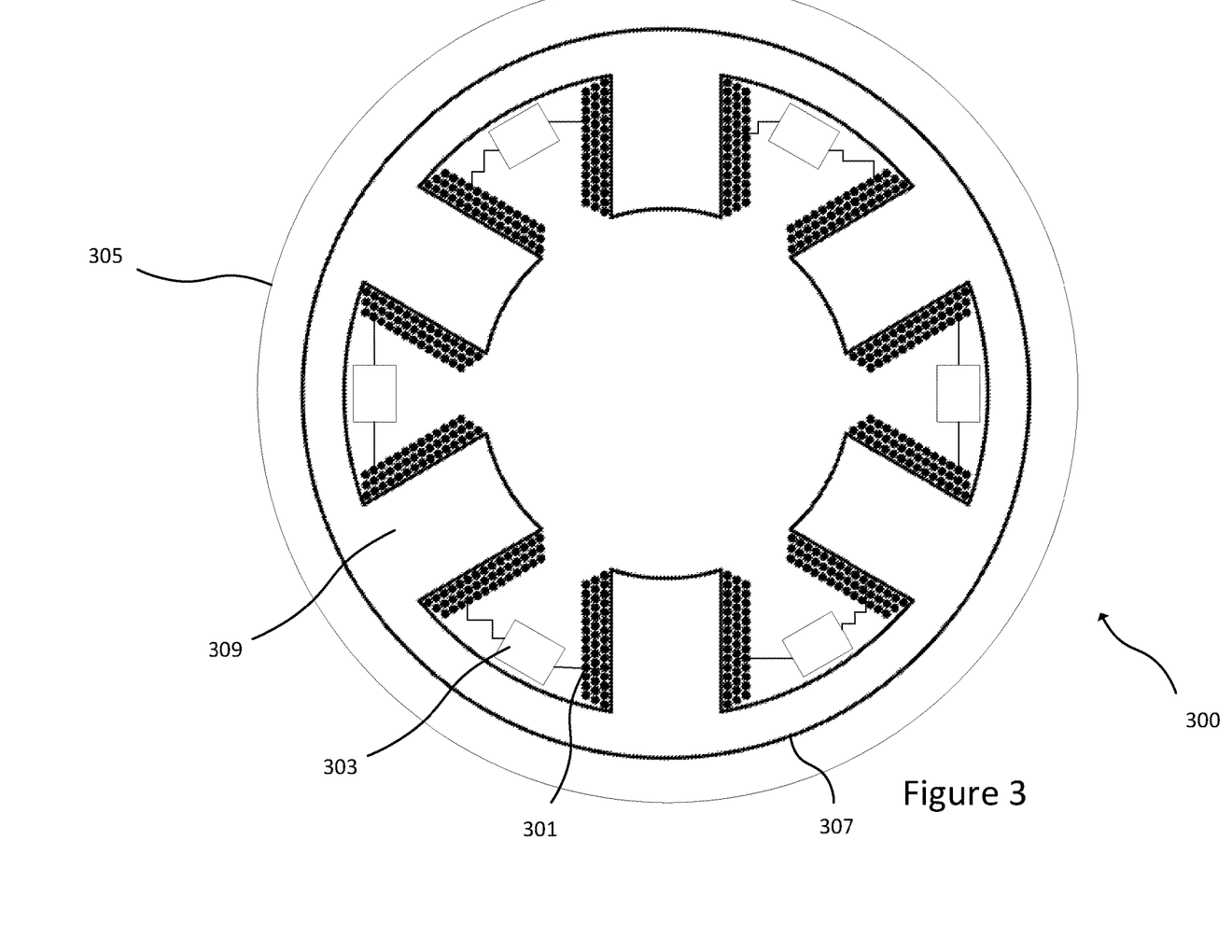
FIG. 3 shows an end cross-section through the example electric motor of FIG. 1.

The example apparatus shown in FIGS. 1 to 3 comprises an electric motor 100 comprising a rotor 200 and a stator assembly 300. In the example shown the rotor 200 fits inside the stator assembly 300 and the stator assembly 300 encircles the rotor 200 providing a tube. The rotor 200 is arranged to rotate about a rotation axis 350 inside the stator assembly 300.

The stator assembly 300 comprises a stator body 307, such as a lamination stack or stator core which may comprise a "back iron". This may comprise high permeability material such as magnetic steel, or a medium permeability material such as an iron powder composite, or it may be provided by a low permeability material such as plastic. The stator body 307 may comprise any such material arranged to support the windings 301 and may or may not act as a magnetic yoke. The stator assembly 300 also comprises a plurality of stator poles 309 extending radially inwards towards the rotor 200. The stator body 307 and stator poles 309 may be formed by a laminated structure. The stator body may also be made in segments.

The stator assembly 300 comprises a plurality of stator windings 301 for driving the rotor 200 of the motor 100. The plurality of stator windings are wrapped around the stator poles 309. The windings 301 may each comprise at least one turn, for example a plurality of turns around a stator pole 309. The stator poles 309, and thereby the plurality of windings 301, are distributed around the circumference of the stator assembly 300 about the rotation axis 350. Power electronics 303 are coupled to the windings 301 for powering the windings 301. The power electronics 303 may also be distributed around the circumference of the stator assembly 300. The stator assembly 300 comprises an enclosure 305, and elements of the power electronics 303 are provided in the enclosure 305 with the stator windings 301. The elements of the power electronics 303 are heat generating elements of the power electronics 303. For example, the power electronics 303 are operable to provide a DC to AC inverter.

The windings 301 extend in the rotation axis 350 from a first depth to a second depth. The elements of the power electronics 303 are located between the first depth and the second depth. In the example shown in FIG. 1, the stator windings 301 extend over a distance in the rotation axis 350. The stator assembly 300 extends in the rotation axis 350 over an active length, the active length being shorter than the length over which the windings 301 extend in the rotation axis 350.

The length of the windings 301 in the axial direction (the direction of the rotation axis 350) is at least coterminous with the stator body 307. The windings 301 may extend beyond the stator body 307—such as when the windings 301 make a turn at an end of the stator body 307, as shown in FIG. 2. The windings 301 may therefore extend beyond the active length of the stator assembly 300, the active length being shown in FIGS. 1 and 2 and being known to those skilled in the art. For example, the active length corresponds to the length of the stator body 307. In the example shown in FIGS. 1 to 3, the enclosure 305 has a length longer than the active length in the axial direction (of the rotation axis). The enclosure 305 also has a length equal to or greater than the length of the windings 301 in the axial direction, and may extend axially beyond the stator body 307 and/or beyond the rotor 200 as shown in FIG. 2.

As shown in FIGS. 2 and 3, the enclosure 305 is radially outside the rotor 200 in a direction transverse to the rotation axis 350 of the electric motor 100. The enclosure 305 is therefore outside the rotor 200 and at least partially encircles the rotor 200—the enclosure 305 forms a tube around the rotor 200 (although of course in other examples the enclosure 305 may take any other shape, such as a cuboid with a square cross-section, for example with a round hole for the rotor 200 in the middle).

The rotor 200, stator assembly 300 and enclosure 305 are provided in an optional housing 500. In the example shown in FIGS. 1 to 3, the enclosure 305 is inside the housing 500 and the housing 500 surrounds and encapsulates the enclosure 305. The housing 500, stator body 307 and enclosure 305 form a nested structure; each of the housing 500, stator body 307 and enclosure 305 may form concentric rings or tubes within each other (although of course in other examples they could form any other variety of shapes). Inside the three structures is the rotor 200 which is driven by currents created in the windings 301 by the power electronics 303.

Figure 6:
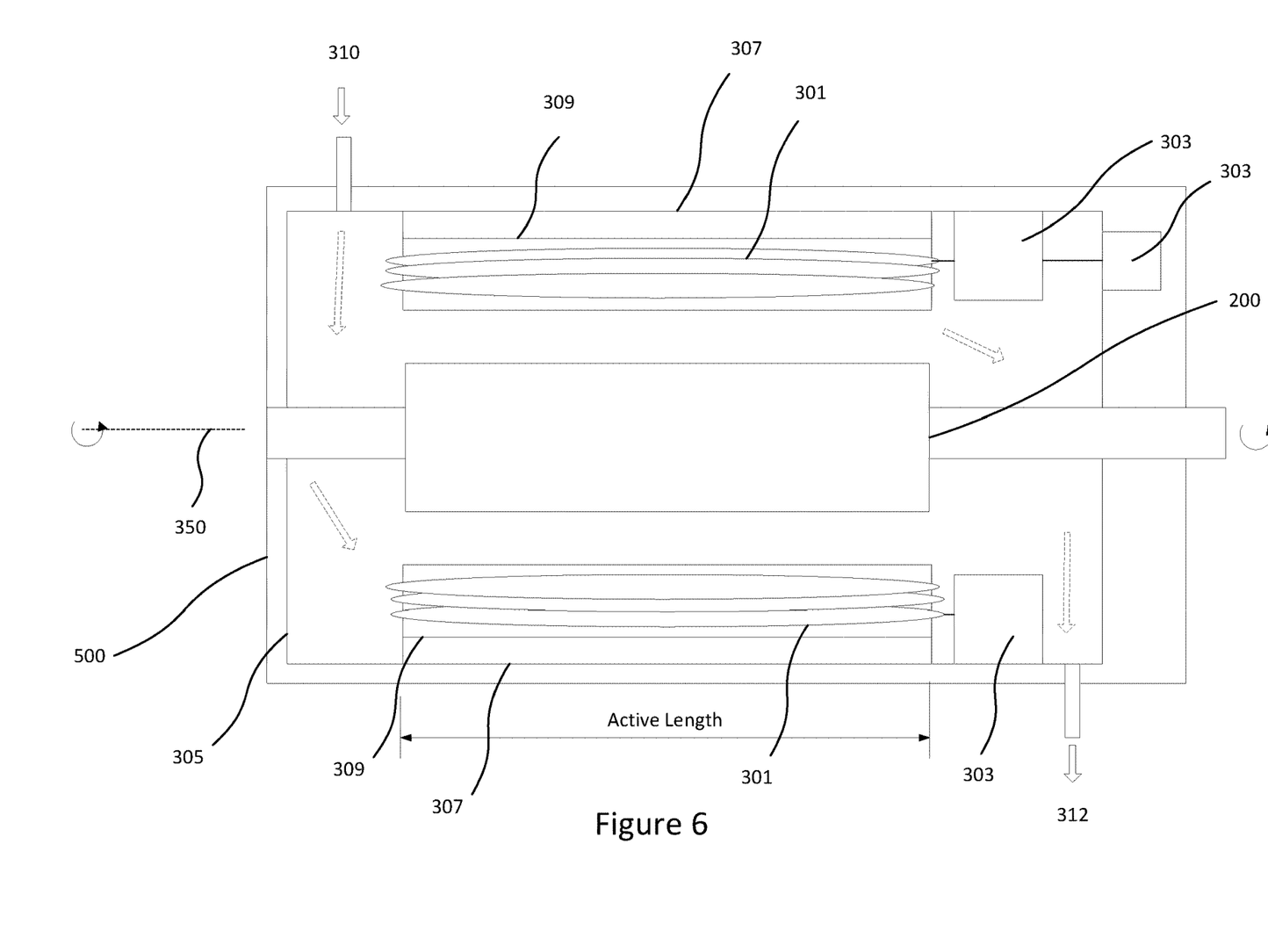
FIG. 6 shows a side cross-section through another example electric motor of embodiments of the disclosure comprising a stator assembly and a rotor.

The enclosure 305 comprises a coolant inlet 310 and a coolant outlet 312 for coupling to a cooling circuit, and the enclosure 305 at least partially defines a flow path in the stator assembly 300. The enclosure 305 provides a cavity to house the windings 301, coolant, and the elements of the power electronics 303. The enclosure 305 may be hermetically sealed apart from the provision of the coolant inlet 310 and coolant outlet 312 to prevent the leakage of coolant. The enclosure 305 may be arranged to provide a selected back-pressure for the flow of coolant from the inlet 310 to the outlet 312. The housing 500 also has an inlet and an outlet for coupling to a cooling circuit and allowing the flow of coolant into and out of the housing 500 and the enclosure 305. For example the inlet 310 and outlet 312 of the enclosure 305 may extend through the housing 500. The housing 500 may also comprise other elements of the electric motor 100 that are not directly cooled by the coolant, for example as shown in FIG. 6 and described in more detail below.

Figure 4:
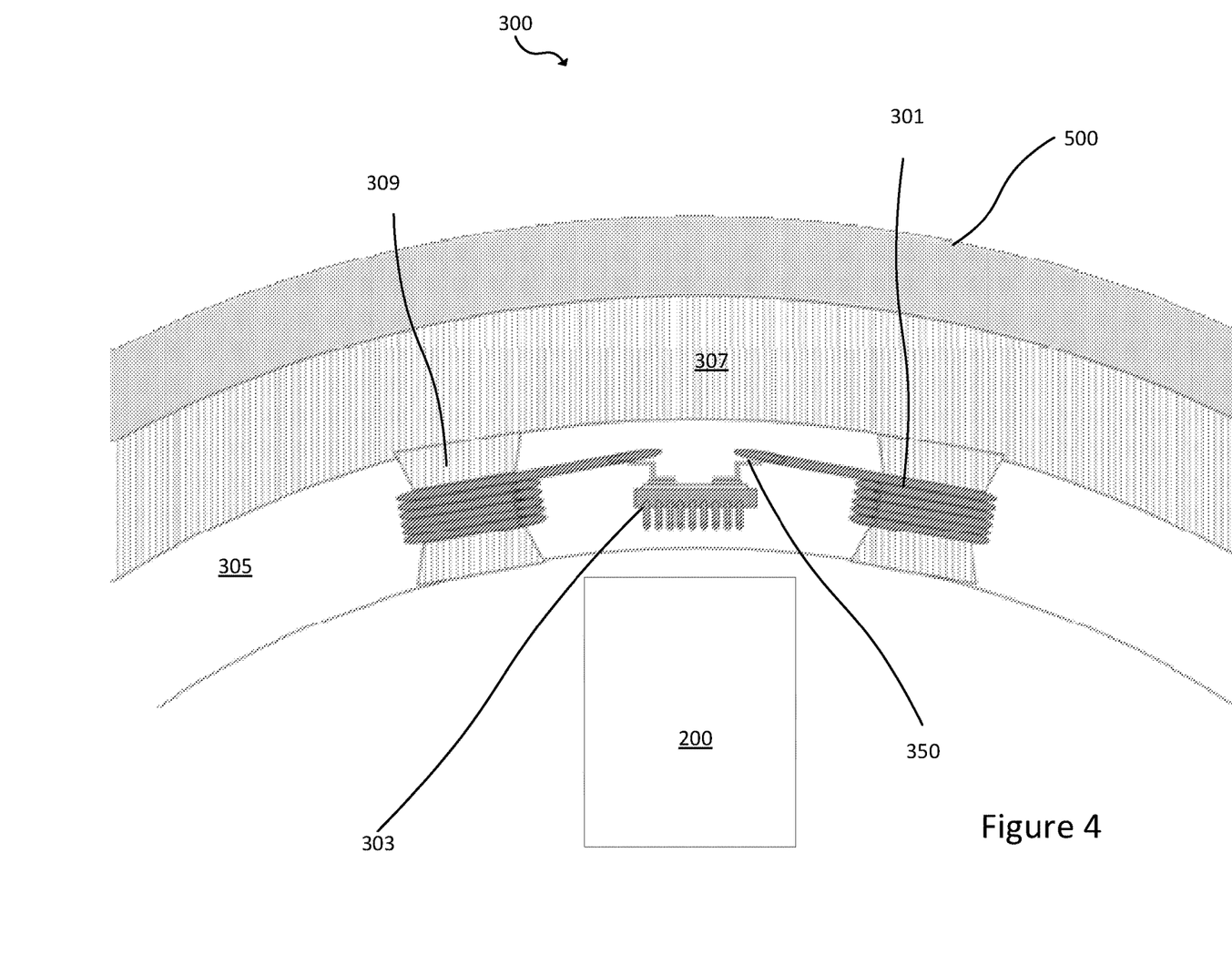
FIG. 4 shows an end cross-section through an example electric motor stator assembly of embodiments of the disclosure.

An end cross-section through the electric motor 100 stator assembly 300 of FIG. 1 is shown in FIG. 3. As can be seen in FIG. 3, the plurality of stator windings 301 are distributed around the circumference of the stator assembly 300 and thereby around the circumference of a rotation axis 350 of the electric motor 100. The stator poles 309 extend from a first radial distance to a second radial distance from the rotation axis 350. The windings 301 therefore may extend from a first radial distance to a second radial distance from the rotation axis 350 when wound around the stator poles 309. In the example shown in FIGS. 1 to 3, the elements of the power electronics 303 are located within the first and second radial distances (i.e. between the ends of the stator poles 309), and are interleaved with and adjacent to the windings 301 on the stator poles 309 extending from the stator body 307. The elements of the power electronics 303 may therefore be embedded in the stator assembly 300. The stator assembly 300 may comprise a plurality of sets of power electronics 303 at least partially distributed around the circumference of the rotation axis 350 of the electric motor 100. For example, the stator assembly 300 may comprise a respective set of elements of the power electronics 303 for each winding 301, per pair of windings 301 (as shown in FIG. 4 described in more detail below), or per phase of the windings 301. In some examples (not shown), each power electronics/winding pair is housed in a respective enclosure 305. These sets may each comprise at least one inverter leg. It will therefore be appreciated in the context of the present disclosure that they also comprise a part of the DC power supply to the inverter (such as a connection to the DC bus) and a part of the AC connection between that inverter leg and the stator windings.

The enclosure 305 is arranged to contain a coolant fluid and to channel the flow of the coolant over both the windings 301 and elements of the power electronics 303. The enclosure 305 is arranged so that the coolant inside the enclosure 305 is in direct contact with both the elements of the power electronics 303 and the windings 301. The enclosure 305 is arranged to flow coolant between the elements of the power electronics 303, for example so that elements of the power electronics 303 are bathed in the coolant in the enclosure 305. The elements of the power electronics 303 may themselves define at least part of a boundary of the flow path of the coolant. The stator assembly 300 is arranged so that elements of the power electronics 303 have equal thermal contact with the coolant on at least three sides in the enclosure 305, for example the elements of the power electronics which are to be cooled in this way may be fixed to a surface at one side so that at least five sides have equal thermal contact with the coolant flow.

The coolant inlet 310 and the coolant outlet 312 are configured to allow the flow of a coolant from outside the housing 500 and the enclosure 305 via the coolant inlet 310, directly over both the windings 301 and the power electronics 303 coupled to the windings 301 inside the enclosure 305, and back outside the enclosure 305 via the coolant outlet 312. In this way the electric motor 100 is configured to directly cool the elements of the power electronics 303 and the windings 301 with a common coolant.

As noted above, the windings 301 extend in the rotation axis 350 from a first depth to a second depth, and this is best seen in FIG. 2. The enclosure 305 is arranged to form part of a cooling circuit (for example by coupling the inlet 310 and outlet 312 to the cooling circuit) and allow the flow of coolant directly over both the windings 301 and the elements of the power electronics 303 between the first and second depths.

To prepare the electric motor for use, the enclosure 305 can be filled with coolant. The coolant, for example a dielectric fluid, for example a liquid such as transformer oil, or deionised water, or a gas such as $SF_6$, is fed into the coolant inlet 310 and fills the enclosure 305 so that the coolant is in contact with both the stator windings 301 and elements of the power electronics 303. Because the enclosure 305 may encircle the rotor 200, the coolant can also encircle the rotor 200. It will thus be understood that rotor may be dry, for example it may be separated from the stator by a wall of the enclosure 305. In some embodiments however the rotor may be wet, for example the enclosure may be arranged so that the flow of coolant bathes both the rotor and stator.

In use, the elements of the power electronics 303 control and/or provide currents to the windings 301 to drive the electric motor 100. Many different types of electric motors may be used, such as inductions motors, switched reluctance motors, SRM, synchronous reluctance, SR, motors, DC series motors and permanent magnet AC motors, PMAC, and other types of motor that will be apparent from the context of the disclosure. In general the principle of operation is similar—electric currents created in the windings 301 by the power electronics 303 create a magnetic field that causes the rotor 200 to turn about the rotation axis 350. Due to the currents created in the windings 301 by the power electronics 303, both the windings 301 and the power electronics 303 may become hot during normal use. Because the coolant is in direct contact with both elements of the power electronics 303 and the windings 301, the coolant can directly cool both the elements of the power electronics 303 and the windings 301.

To effectively act to cool the windings 301 and the elements of the power electronics 303, the coolant may be pumped through the enclosure 305, for example by a pump (not shown). The coolant may be pumped through a cooling circuit coupled to the stator assembly 300 and/or to the enclosure 305 and/or housing 500, via the coolant inlet 310 and outlet 312 of the enclosure 305. The cooling circuit may comprise a heat exchanger, such as a radiator (also not shown). As the coolant is pumped through the enclosure 305 (for example as indicated by the dotted arrows in FIG. 2) it may bathe the elements of the power electronics 303 in coolant, so that the elements of the power electronics 303 are in equal thermal contact with the coolant on at least three sides, and preferably on all sides.

The coolant may therefore flow between, under and over the elements of the power electronics 303 as it flows through the enclosure 305. The elements of the power electronics 303 may therefore define a boundary of the flow path of the coolant. Similarly the coolant may bathe the windings 301 and flow between the windings 301, and the windings 301 may also define a boundary of the flow path of the coolant. As the coolant is pumped through the enclosure 305, it may travel in an axial direction parallel to the rotation axis 350, but additionally or alternatively, in a circumferential direction around the rotation axis 350. The enclosure 305 may comprise vanes or channels for directing the flow of coolant in a particular direction along a coolant flow path through the enclosure 305.

Accordingly, another aspect of the disclosure relates to a method for preparing an electric motor 100 for use. The method comprises obtaining an electric motor 100 comprising a rotor 200 and a stator assembly 300, the stator assembly 300 comprising an enclosure 305 defining a coolant flow path. The method comprises filling the enclosure 305 with a coolant, such as a dielectric fluid, to directly contact both stator windings 301 and power electronics 303 in the stator assembly 300.

As noted above, the use of direct cooling allows the elements of the power electronics 303 to be cooled on all sides. For example, the elements of the power electronics 303 may be supported suspended in the enclosure 305, so that coolant can flow both over and under the elements of the power electronics 303 and bathe the elements of the power electronics 303. In some examples the coolant can flow between the elements of the power electronics 303. The coolant can also cool the power interconnections between the power electronics 303 and the windings 301.

In the example of FIGS. 1 to 3, the elements of the power electronics 303 are coupled to the windings 301 adjacent to the windings 301 inside the enclosure 305. In some examples the elements of the power electronics 303 comprise elements of an inverter, for example comprising a DC link capacitor and a signal controlled impedance, for example a current or voltage controlled impedance such as a transistor. The stator assembly 300 may therefore comprise an integrated inverter with direct cooling of the inverter and windings 301 provided by the coolant in the enclosure 305.

In some examples, the power electronics 303 may be directly coupled to the windings 301. For example, as can be seen in FIG. 4, a leg 350 of the elements of the power electronics 303 (for example the leg of a semiconductor chip such as a signal controlled impedance) is directly coupled to each winding 301. Directly coupling the power electronics 303 to the windings 301 in this way minimises the number of connections and losses, and also allows the connection (power interconnection) to be directly cooled by the coolant in the enclosure 305.

Figure 5:
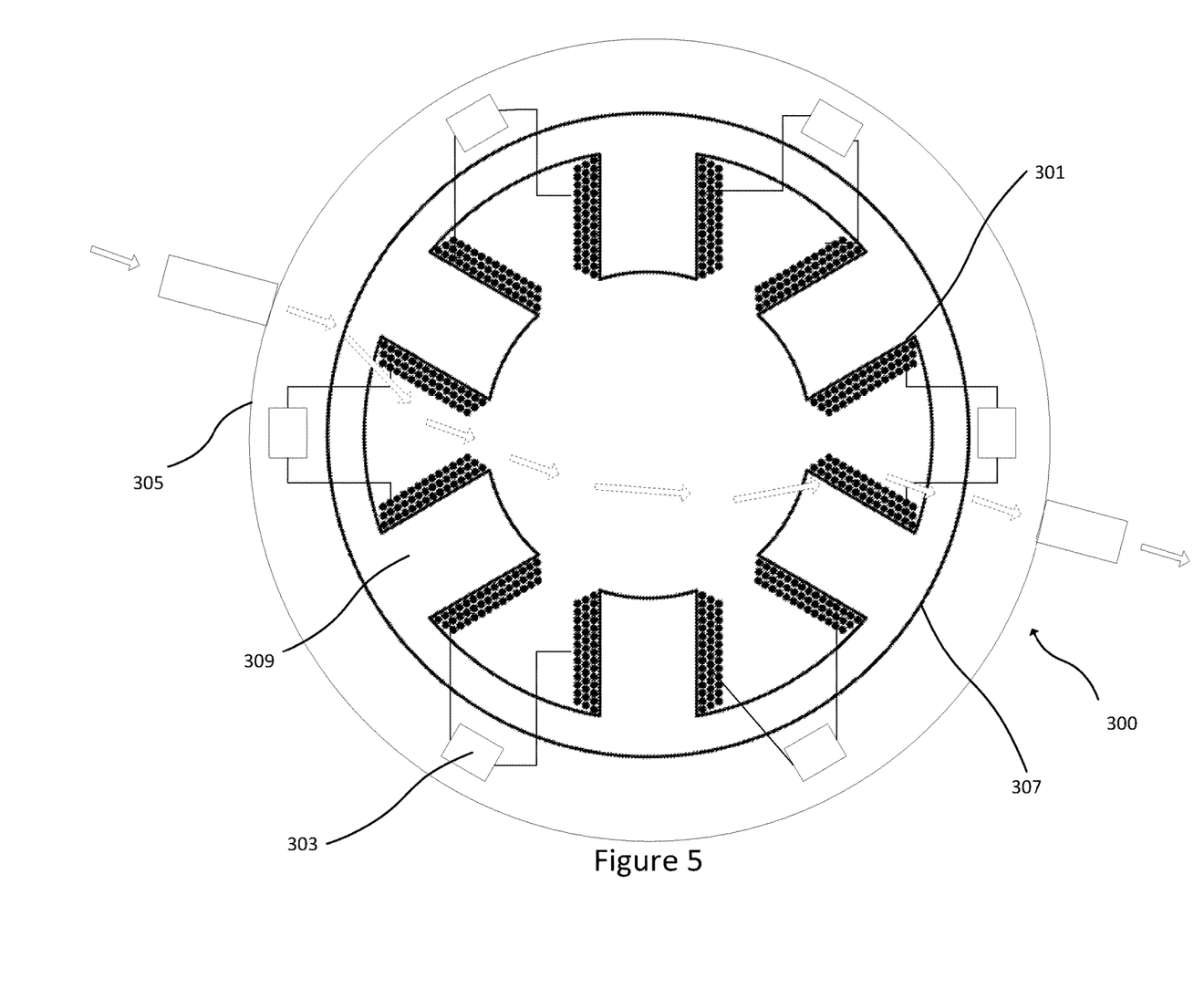
FIG. 5 shows an end cross-section through another example electric motor stator assembly of embodiments of the disclosure.

In some examples, elements of the power electronics 303 may be located radially outside the windings 301, as shown in FIG. 5. For example, elements of the power electronics 303 may be located radially outside the stator body 307 but radially inside the enclosure 305. In use, coolant may flow into the enclosure 305 via the coolant inlet (as shown by the dotted lines in FIG. 5), around the elements of the power electronics 303, thorough the stator body 307 and into contact with the windings 301, and out through outlet 312. For example, the stator body 307 may comprise apertures or vents to allow the passage of coolant therethrough. In some examples the power electronics 303 could be disposed at a single location (as opposed to being circumferentially distributed) and still have the coolant flow over them and then the windings. For example, a motor may comprise a terminal box where the wires enter which is typically a rectangular box on the side of the motor. The power electronics may be provided in such a terminal box and the enclosure may channel coolant flow through that terminal box and through the windings before or after it has flowed through the windings.

In the examples shown in FIGS. 1 to 3, the elements of the power electronics 303 are within the active length of the stator assembly 300. However, in some examples as shown in FIG. 6, the elements of the power electronics 303 are outside the active length. For example, the enclosure 305 extends in the axial direction (of the rotation axis 350) beyond the active length. The elements of the power electronics 303 may be in the enclosure 305 axially outside the active length. For example, the elements of the power electronics 303 may be adjacent to and/or nested in (not shown) a turn of the windings 301 outside the active length, for example outside the stator body 307.

In some examples the elements of the power electronics 303 may be radially inside the windings 301. For example, if the power electronics 303 are outside (i.e. axially displaced from) the active length, the power electronics 303 may be radially inside the windings 301. For example, the power electronics 303 may be radially inside the diameter of the rotor 200 if they overhang the end of the rotor in the axial (rotation axis 350) direction.

The power electronics 303 may be part of a controller or control logic operable to drive the electric motor 100. Parts of the controller may be located outside the enclosure 305, but for example in the housing 500 of the electric motor 100. For example, as shown in FIG. 6, other parts of the power electronics 303 may be located outside the enclosure 305 but inside the housing 500. The parts of the power electronics 303 located outside the enclosure 305 may be coupled to the elements of the power electronics inside the enclosure 305, as shown in FIG. 6. The controller may receive input signals, such as a demand for torque, that are translated using algorithms to drive currents in the windings 301 and thereby drive the rotor 200 and thereby the electric motor 100. For example, the parts of the power electronics 303 outside the enclosure 305 may receive the signals and thereby operate the elements of the power electronics 303 inside the enclosure to drive currents in the windings 301 to drive the rotor 200.

In some examples, as shown in FIG. 6, the rotor 200 may also be inside the enclosure 305, such that the coolant can be in direct contact with the windings 301, the elements of the power electronics 305 and the rotor 200.

As noted above, in some examples the electric motor 100 may be an AC electric motor or a DC electric motor. The electric motor 100 may comprise a DC supply to the power electronics 303, for example from a battery, and an AC supply from the power electronics 303 to the windings 301. The elements of the power electronics 303 may encompass at least one of the DC supply to the power electronics 303 and the AC supply to the windings 301.

In some examples the electric motor 100 may run from an AC supply which is rectified to DC and then converted again to drive the motor windings 301. In this case as well as the elements of the power electronics 303 being directly cooled by the coolant, the AC to DC electronics may also be directly cooled by the coolant in the enclosure. In some examples the power electronics may provide a "matrix converter" which converts from one type of AC directly to another type of AC.

As noted above, the elements of the power electronics 303 may be heat generating elements of the power electronics 303. The elements of the power electronics 303 may comprise at least one of: an inductor, a capacitor, a DC link capacitor, a DC bus bar, an AC bus bar and a power connection. The elements of the power electronics 303 may comprise semiconductors such as power semiconductors, for example signal controlled impedances such as voltage or current controlled impedances, for example insulated gate bipolar transistors, IGBTs, field effect transistors, FETs, such as junction field effect transistors, JFETS, insulated gate field effect transistors, IGFETS, metal oxide semiconductor field effect transistors, MOSFETs, and any other type of transistor. The signal controlled impedances may be operated as switches.

The elements of the power electronics 303 may be supported suspended in the enclosure 305 by their connections to the windings 301 as shown in FIG. 3, and/or by a substrate, such an FR4, IMS or DBC substrate, or other substrates that will be apparent from the context of the disclosure. The elements of the power electronics 303 may also be in some form of package which may or may not have one of these substrates, for example the power electronics 303 may comprise semiconductor chips mounted on copper tabs which may be over-moulded with resin/plastic. As noted above, supporting the elements of the power electronics 303 suspended in the enclosure 305 may allow coolant to flow both over and under the elements of the power electronics 303, for example so that all sides of the elements of the power electronics 303 are in equal thermal contact with the coolant.

In some examples the coolant has a higher heat capacity than air. For example, the coolant may be a dielectric fluid such as a liquid, for example transformer oil or deionised water, or a gas such as sulphur hexafluoride, $SF_6$ or air.

In some examples the enclosure 305 comprises two cavities coupled by a channel, wherein the first cavity is at least partially in the stator assembly 300, such as in the stator body 307, and the second cavity is located axially of the first cavity outside the stator assembly 300. Alternatively, the first cavity may be in the stator body 307 and the second cavity outside the stator body 307 but still within the stator assembly 300. The windings 301 may be in the first cavity and the power electronics 303 may be in the second cavity. In some examples, the housing 500 may comprise a plurality of enclosures 305.

In some examples the power electronics 303 may be coupled to the stator body 307 or stator poles 309, for example thermally coupled, so that the stator body 307 and/or stator poles 309 act as a heatsink. For example, the elements of the power electronics 303 may be embedded in the stator assembly 300, for example embedded in the stator body 307. In some examples the elements of the power electronics 303 may be integrated into the stator assembly 300, for example into the stator body 307. In some examples a separate heatsink may be provided, and the elements of the power electronics 303 may be coupled to the heatsink. The heatsink may comprise fins or protrusions configured to dissipate heat to a coolant. The fins or protrusions may extend or protrude into the enclosure 305. The elements of the power electronics 303 may comprise these fins or protrusions. As with other elements of the power electronics 303, the fins or protrusions of the heatsink may be bathed in the same coolant as that used to bathe the windings 301. The fins or protrusions may be arranged so that at least two surfaces, or at least three surfaces of the protrusions or fins are in direct contact with and/or in thermal equilibrium the coolant.

Another aspect of the disclosure therefore relates to an electric motor stator assembly 300, the stator assembly 300 comprising a plurality of stator windings 301 for driving a rotor 200 of an electric motor 100. The stator assembly 300 comprises power electronics 303 coupled to the windings 301 and for powering the windings 301, and an enclosure 305. The power electronics 303 are coupled to a heatsink in the enclosure 305, and the stator assembly 300 is arranged so that coolant in the enclosure 305 can be in direct contact with both the heatsink and the windings 301.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements, such as that of the power electronics 303, shown in the drawings may be further subdivided, and/or distributed throughout apparatus of the disclosure. In some embodiments the function of one or more elements, such as the power electronics 303, shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In an embodiment there is provided a method for preparing an electric motor for use, the method comprising: obtaining an electric motor comprising a rotor and a stator assembly, the stator assembly comprising an enclosure defining a coolant flow path; and filling the enclosure with a dielectric fluid to directly contact both stator windings and power electronics in the stator assembly. The electric motor stator assembly may comprise any one or more of the features of any of the stator assemblies described and/or claimed herein.

It will be appreciated in the context of the present disclosure that the methods and apparatus described herein may also be used for linear electrical machines. Such as linear motors. It will also be appreciated that in such machines the stator and rotor are "unrolled" so that instead of producing torque (rotation) they produce a linear force along their length. However, linear motors are not necessarily straight. Characteristically, a linear motor's active section has ends, whereas more conventional motors are arranged as a continuous loop. Examples of linear motors comprise linear drivers which use Lorenz force to move an actuator (as a motor rotates a rotor) and accelerators. In an aspect there is provided a stator assembly comprising: a plurality of stator windings for driving an actuator of the machine; power electronics coupled to the windings for powering the windings, and an enclosure; wherein elements of the power electronics and windings are housed in the enclosure which is arranged to channel a flow of coolant over both the windings and the elements of the power electronics. The enclosure of this stator assembly and its other components may be arranged in the manner of any of the stator assemblies described and/or claimed herein.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The invention claimed is:

1. A stator assembly comprising:
an enclosure; and
stator windings and power electronics coupled to the windings for powering the windings;
wherein the stator assembly is an electric motor stator assembly and the stator windings are for driving a rotor of the motor;
wherein the elements of the power electronics and windings are housed in the enclosure which is arranged to channel the flow of coolant over both the windings and the elements of the power electronics;
wherein the stator assembly comprises a respective set of power electronics for driving each winding, each pair of windings or each phase of windings; and
wherein the sets of power electronics are interleaved with the stator windings in the enclosure, and wherein each set comprises at least one inverter leg.

2. The apparatus of claim 1, wherein the enclosure is arranged so that the flow of coolant inside the enclosure is in direct contact with both the elements of the power electronics and the windings.

3. The apparatus of claim 1, wherein the enclosure is at least one of:
arranged so that the flow of coolant passes between at least some of the elements of the power electronics; and
arranged so that the elements of the power electronics are bathed in, and at least partially immersed in, the flow of coolant in the enclosure.

4. The apparatus of claim 1, wherein the stator assembly is arranged so that coolant has equal thermal contact on at least three sides of the elements of the power electronics within the enclosure.

5. The apparatus of claim 1, wherein at least some of the elements of the power electronics are supported suspended in the enclosure, so that coolant can flow both over and under the elements of the power electronics.

6. The apparatus of claim 1, wherein the elements of the power electronics at least partially define boundary of a flow path in the stator assembly.

7. The apparatus of claim 1, wherein the electric motor has a rotation axis, and the enclosure is at least one of:
radially outside the rotor in a direction transverse to the rotation axis; or
extends axially beyond the rotor.

8. The apparatus of claim 1, wherein the electric motor has a rotation axis and the enclosure comprises two cavities coupled by a channel, wherein the first cavity is at least partially in the stator assembly and the second cavity is located axially of the first cavity.

9. The apparatus of claim 8 wherein the windings are in the first cavity and the power electronics are in the second cavity.

10. The apparatus of claim 1, wherein the electric motor has a rotation axis, and the windings extend in the rotation axis from a first depth to a second depth;
wherein the elements of the power electronics are located between the first depth and the second depth; and
wherein the enclosure is arranged to allow the flow of coolant over both the windings and the elements of the power electronics between the first depth and the second depth.

11. The apparatus of claim 1,
wherein the electric motor has a rotation axis and the windings extend from a first radial distance to a second radial distance from the rotation axis;
wherein the elements of the power electronics are located within the first and second radial distances; and
wherein the enclosure is configured to allow the flow of coolant over both the windings and the elements of the power electronics between the first and second radial distances.

12. The apparatus of claim 1, wherein the coolant is a dielectric liquid.

13. The apparatus of claim 1, comprising:
a plurality of enclosures, wherein each set of power electronics is housed in a respective one of the plurality of enclosures with at least one stator winding, the stator winding being the stator winding driven by the each set of power electronics.

14. The apparatus of claim 1, wherein at least one of the plurality of windings and the power electronics are at least partially distributed around the circumference of the stator assembly.

15. The stator assembly of claim 1, wherein the power electronics are embedded in the stator assembly; and
the stator assembly comprises a coolant flow path arranged to allow the flow of coolant directly over both the windings and the power electronics.

16. A method of assembling an electric motor, or preparing an electric motor for use, the method comprising:
providing a stator assembly comprising an enclosure, stator windings, and power electronics coupled to the windings for powering the windings;
wherein the stator assembly is an electric motor stator assembly and the stator windings are for driving a rotor of the motor;
wherein the elements of the power electronics and windings are housed in the enclosure which is arranged to channel the flow of coolant over both the windings and the elements of the power electronics thereby providing a coolant flow path;
wherein the stator assembly comprises a respective set of power electronics for driving each winding, each pair of windings or each phase of windings;
wherein the sets are interleaved with the stator windings in the enclosure, and wherein each set comprises at least one inverter leg; and
providing a dielectric liquid into the coolant flow path to expel air from spaces between the stator windings and elements of the power electronics, thereby to directly bathe both in the dielectric liquid.

* * * * *